Patented Oct. 7, 1941

2,258,202

UNITED STATES PATENT OFFICE 2,258,202

LUBRICANT

Leo G. Burns, Osage, Wyo., assignor of one-fourth to Earl Whedon, one-fourth to Levi S. Howes, and one-fourth to John J. Bentley, all of Sheridan, Wyo.

No Drawing. Application May 16, 1940,
Serial No. 335,613

2 Claims. (Cl. 252—29)

This invention relates to a formula and more particularly to an improved lubricant and preservative for use in drilling or boring wells, as well as on machinery.

One object of the invention is to provide a lubricant which will form a film on metal parts and effectively prevent rusting thereof.

Another object of the invention is to provide a lubricant which will greatly reduce wear.

A further object of the invention is to provide a lubricant which will effectively preserve the threads on all joints and moving parts so that destruction of these joints and/or parts will be effectively prevented.

And still another object of the invention is to provide a formula which employs but three ingredients and which may, therefore, be mixed with the utmost facility and at the place where it is to be used.

Other objects and advantages of the lubricant will become apparent during the use thereof.

My improved lubricant consists of three ingredients, namely, water, graphite and bentonite. The ingredients may vary as to amounts but it is desired to state that the following proportions have been found satisfactory: graphite 2% by weight, bentonite 98% by weight, and sufficient water to render the graphite and bentonite combination in such a state that it will be permitted to form a film about a part to be lubricated.

It has been found that the formula may be mixed in the following proportions: graphite 12% by weight, bentonite 88% by weight, and sufficient water to render the mixture capable of forming a film on a metal part to be lubricated.

In mixing my improved lubricant, the graphite is mixed and sifted through the bentonite. In other words, the graphite and bentonite are thoroughly commingled. This mixture of graphite and bentonite is mixed with water when it is desired to place the lubricant in actual use. It will be seen that the two dry ingredients of the lubricant, in mixed condition, may be conveniently carried from place to place and, when desired, mixed with water to render it ready for use.

The purpose of the graphite is to lubricate by forming a film on the metal to be protected, which will have the effect of preventing the metal from wearing and also preventing formation of rust thereon. Also threads on all joints and moving parts will be effectively protected. The bentonite serves the purpose of suspending the graphite so that it will be distributed within the well being bored or drilled and will also materially reduce vibration of the drilling pipe.

As heretofore stated, although the graphite is recited as being, in one instance, two parts in a hundred, and, in another instance, as twelve parts in a hundred, any suitable or desired ratio of graphite and bentonite may be used.

Having thus described the invention, what I claim is:

1. A lubricant including graphite in the amount of substantially two parts in a hundred, bentonite in the amount of substantially ninety-eight parts in a hundred, and water in sufficient amount to render the mixture of graphite and bentonite free flowing.

2. In a lubricant, graphite in the amount of 2% by weight and bentonite in the amount of 98% by weight.

LEO G. BURNS.